(12) United States Patent
Collier et al.

(10) Patent No.: US 12,052,981 B1
(45) Date of Patent: Aug. 6, 2024

(54) SUBMERSIBLE LIGHTING DEVICE FOR ATTRACTING FISH

(71) Applicants: John Collier, Rockdale, TX (US); Mark Steven Collier, Taylor, TX (US)

(72) Inventors: John Collier, Rockdale, TX (US); Mark Steven Collier, Taylor, TX (US)

( * ) Notice: Subject to any disclaimer, the term of this patent is extended or adjusted under 35 U.S.C. 154(b) by 0 days.

(21) Appl. No.: 18/297,609

(22) Filed: Apr. 8, 2023

(51) Int. Cl.
| | |
|---|---|
| *A01K 97/00* | (2006.01) |
| *F21V 23/06* | (2006.01) |
| *F21V 31/00* | (2006.01) |
| *F21Y 113/10* | (2016.01) |
| *F21Y 115/10* | (2016.01) |

(52) U.S. Cl.
CPC .............. *A01K 97/00* (2013.01); *F21V 23/06* (2013.01); *F21V 31/005* (2013.01); *F21Y 2113/10* (2016.08); *F21Y 2115/10* (2016.08)

(58) Field of Classification Search
CPC ................................ A01K 97/00; A01K 75/02
USPC ......................................................... 43/17.5
See application file for complete search history.

(56) References Cited

U.S. PATENT DOCUMENTS

| | | | | |
|---|---|---|---|---|
| 2,806,131 | A | * | 9/1957 | Palmer .................... F21V 21/06 116/63 P |
| 3,192,379 | A | | 6/1965 | Garmo |
| 3,339,066 | A | | 8/1967 | Hart |
| 3,698,025 | A | * | 10/1972 | Worobel .............. B63B 22/166 441/16 |
| 3,935,660 | A | * | 2/1976 | Plew ...................... A01K 85/01 43/42.31 |
| 3,949,213 | A | | 4/1976 | Paitchell |
| 4,216,411 | A | | 8/1980 | Ehret et al. |
| 4,234,819 | A | | 11/1980 | Maxey |
| 4,460,944 | A | | 7/1984 | Gordbegli et al. |
| 4,475,301 | A | | 10/1984 | Wortham |
| 4,563,668 | A | * | 1/1986 | Martino .................. E01F 9/617 340/908.1 |
| 4,574,337 | A | | 3/1986 | Poppenheimer |

(Continued)

FOREIGN PATENT DOCUMENTS

| | | | | |
|---|---|---|---|---|
| CN | 202647399 | U | * 1/2013 | ............. A01K 75/02 |
| JP | 2008098122 | A | * 4/2008 | |

(Continued)

OTHER PUBLICATIONS

Merged translation of JP_2008098122 (Year: 2008).*

(Continued)

*Primary Examiner* — Morgan T Jordan
(74) *Attorney, Agent, or Firm* — James Zantos

(57) ABSTRACT

A person may wish to use a submersible light to attract aquatic life, including fish. The submersible light described herein may include a mounting body around which outward facing lights are disposed. The lights may be powered with a connected power cord. To prevent water from contacting sensitive electronics within the submersible light, a water tight enclosure is created between the outside of the mounting body and an outer transparent covering. The submersible light may have ballast material inside the mounting body. The ballast material affects the buoyancy of the mounting body when it is placed in the water. The submersible lighting device may also emit a variety of light spectrums and light intensity levels which the user can control.

10 Claims, 5 Drawing Sheets

(56) References Cited

U.S. PATENT DOCUMENTS

| | | | |
|---|---|---|---|
| 4,697,374 A | | 10/1987 | Simms |
| 4,947,304 A | * | 8/1990 | Payne ................... F21V 19/04 |
| | | | 362/267 |
| 5,133,145 A | | 7/1992 | McDonald |
| 5,140,216 A | * | 8/1992 | Darr ..................... F21L 14/026 |
| | | | 313/493 |
| 5,416,676 A | * | 5/1995 | Carpenter ............. A01K 97/00 |
| | | | 362/223 |
| 5,651,209 A | | 7/1997 | Rainey |
| 5,688,042 A | * | 11/1997 | Madadi .................... F21V 3/00 |
| | | | 362/240 |
| 6,203,170 B1 | * | 3/2001 | Patrick ................. A01K 79/02 |
| | | | 362/249.06 |
| 7,192,160 B2 | * | 3/2007 | Reiff, Jr. .................. F21L 2/00 |
| | | | 362/228 |
| 7,195,368 B2 | | 3/2007 | Heath, II |
| 7,210,818 B2 | * | 5/2007 | Luk ...................... H05K 1/189 |
| | | | 362/249.14 |
| 7,520,628 B1 | | 4/2009 | Sloan et al. |
| 8,029,159 B2 | * | 10/2011 | Chen ..................... F21V 29/70 |
| | | | 362/249.03 |
| 8,235,561 B2 | | 8/2012 | Schimmelpfenning et al. |
| 8,316,577 B2 | * | 11/2012 | Hale ...................... A01K 91/10 |
| | | | 43/43.11 |
| 8,449,139 B1 | * | 5/2013 | Wang .................... F21V 29/70 |
| | | | 362/267 |
| 8,690,374 B2 | | 4/2014 | Miller |
| 8,864,326 B2 | | 10/2014 | Armer et al. |
| 9,845,947 B1 | | 12/2017 | Shanahan, III |
| 2006/0221595 A1 | * | 10/2006 | Payne ..................... F21V 29/83 |
| | | | 362/267 |
| 2007/0268702 A1 | | 11/2007 | McFadden |
| 2012/0002417 A1 | * | 1/2012 | Li ............................. F21S 4/28 |
| | | | 362/249.02 |
| 2012/0079755 A1 | * | 4/2012 | Torres ................... A01K 97/02 |
| | | | 43/17.5 |
| 2013/0152864 A1 | * | 6/2013 | Grajcar ................. A01K 63/06 |
| | | | 362/101 |
| 2013/0170212 A1 | | 7/2013 | Cuda et al. |
| 2014/0109462 A1 | * | 4/2014 | Harding ................. A01K 95/00 |
| | | | 156/85 |
| 2015/0253000 A1 | * | 9/2015 | Abernethy ............. F21L 14/02 |
| | | | 362/249.06 |
| 2017/0122536 A1 | * | 5/2017 | Noga ..................... A01K 79/00 |
| 2018/0045400 A1 | | 2/2018 | Bushee |
| 2021/0388966 A1 | * | 12/2021 | Ruan ....................... H05B 3/16 |

FOREIGN PATENT DOCUMENTS

| | | | |
|---|---|---|---|
| KR | 100885458 B1 | * | 2/2009 |
| KR | 100981662 B1 | * | 9/2010 |
| KR | 101147511 B1 | * | 5/2012 |
| KR | 101345690 B1 | * | 12/2013 |
| KR | 102168137 B1 | * | 10/2020 |

OTHER PUBLICATIONS

Merged translation of KR_100885458 (Year: 2009).*
Merged translation of KR_100981662 (Year: 2010).*
Merged translation of KR_101147511 (Year: 2012).*
Merged translation of CN_202647399 (Year: 2013).*
Merged translation of KR_101345690 (Year: 2013).*
Merged translation of KR_102168137 (Year: 2020).*
Amazon.com (Vendor: SAMDO); SAMDO IP68 12V LED Underwater Fishing Light 1080 Lumens Fish Attracting Light, Night Fishing Light 10.8W; https://www.amazon.com/Samdo-Green-Underwater-Fishing-Lumens/dp/B01MOS5BUK/.
Westmarine.com; 6" LED Fishing Light, 12V, Green; https://www.westmarine.com/hydro-glow-6inch-led-fishing-light-12v-green-20529442.html.
Illumisea.com; Mini BriteBite Submersible LED Fishing Light (25w); https://www.illumisea.com/pages/mini-britebite-led-fishing-light?srsltid=AfmBOor6YiXKyU9YFz3JGx2vU9BGcWNCTiyDrxyTp4eRub7INglrXtg58FI.
Underwaterfishlight.com; Classic Quad Fish Light For Docks; https://underwaterfishlight.com/product/classic-natural-green-quad-light-system/.
The Greenmonsterfishinglight.com; Single Light Kit https://www.thegreenmonsterfishinglight.com/product/single-light-kit.
Outdoorwatersolutions.com; Green Monster Fishing Light (Single)—Best in the Industry !; https://outdoorwatersolutions.com/product/green-monster-fishing-light-single/.
Tendelux.com; Tendelux FG20H 110V Underwater Fishing Light, Super Bright Green LED Submersible Light Attractant; https://tendelux.com/products/23w-110v-underwater-fishing-light-super-bright-green-led-submersible-light-attractant.
Outriggeroutdoors.com; Underwater Green Boat Fishing Light; https://outriggeroutdoors.com/products/underwater-green-boat-fishing-light?currency=USD&variant=32180803928177&stkn=abf7ccd6b234.
Uunderwaterfishlight.com; 12v LED Fishing Light; https://underwaterfishlight.com/product/12v-led-fishing-light/?attribute_select-color=Green.

* cited by examiner

SUBMERSIBLE LIGHTING DEVICE FOR ATTRACTING FISH

BACKGROUND

Field of the Invention

This invention relates to underwater illumination; more particularly, the use of a submersible lighting device to attracting freshwater or saltwater aquatic life, primarily fish.

SUMMARY

The disclosure concerns a submersible lighting device which may be used to attract aquatic life. The submersible lighting device may be connected to a power supply and placed in a body of water to attract fish. The submersible lighting device is generally used in low-light environments or during low-light hours so that the brightness of the light stands out in greater contrast against the surrounding darkness. It is generally understood that a submerged light source attracts desirable fish because it initiates a chain reaction in the aquatic food chain. The light attracts small animals such as plankton. Smaller fish are then attracted to the light in response to the presence of their food source, plankton. Larger fish are then attracted to the light in response to the presence of the smaller fish. The user may then experience improved fishing results by fishing in close proximity to the submerged light source.

BRIEF DESCRIPTION OF THE DRAWINGS

Other features, combinations, and embodiments will be appreciated by one having the ordinary level of skill in the art of submersible lighting devices and accessories upon a thorough review of the following details and descriptions, particularly when reviewed in conjunction with the drawings, wherein.

DETAILED DESCRIPTION

Figure 1:
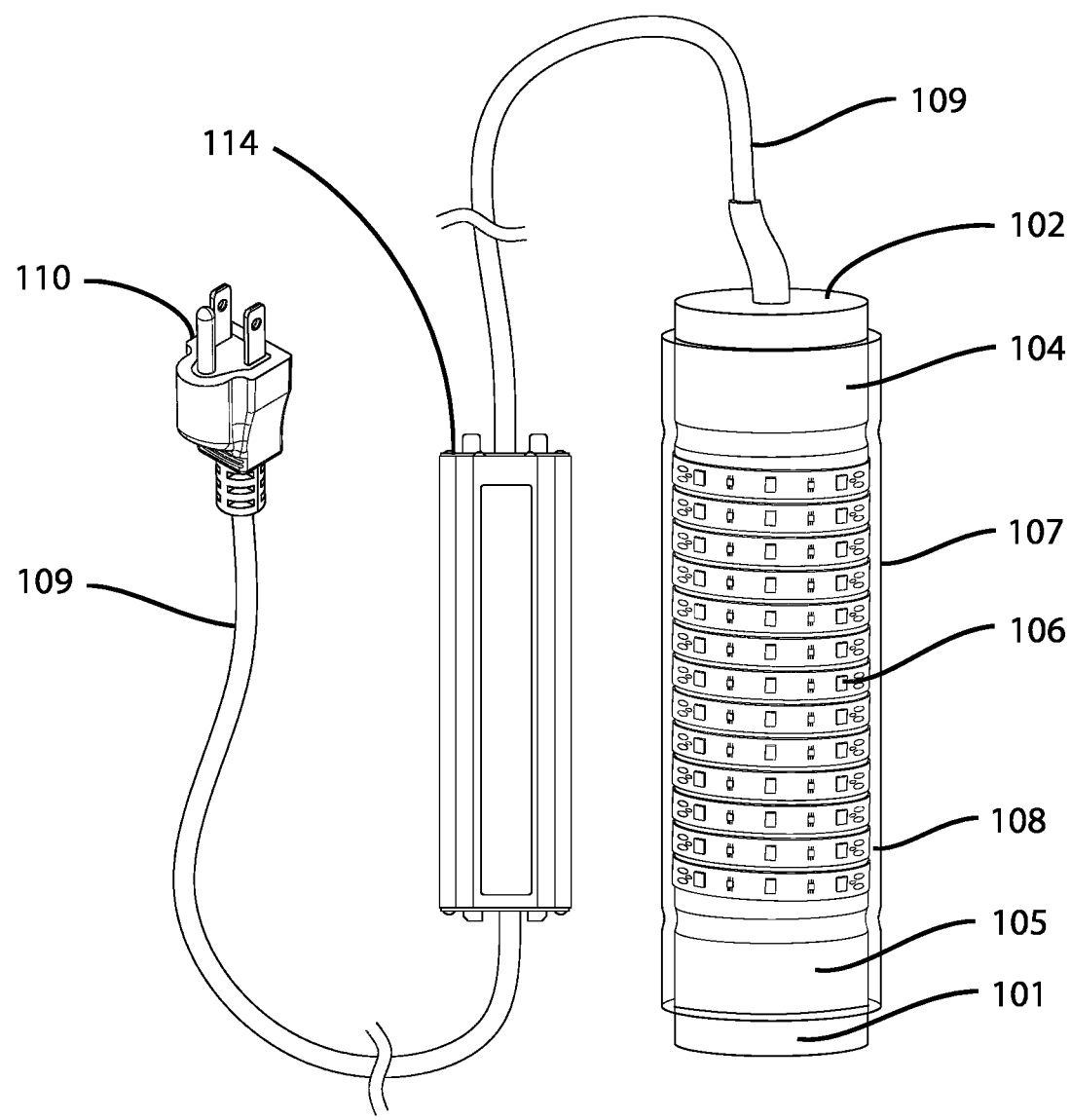
FIG. 1 shows a side view of the submersible lighting device in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

Unless explicitly defined herein, terms are to be construed in accordance with the plain and ordinary meaning as would be appreciated by one having skill in the art.

General Description of Embodiments

A submersible lighting device is disclosed. In the preferred embodiment the submersible lighting device is constructed around a mounting body. The mounting body forms an outer surface onto which lights may be attached. In some embodiments the mounting body is a cylindrical shape. The cylindrical mounting body embodiment has a top covering which covers the circular shape of the top of the cylindrical mounting body. The cylindrical mounting body embodiment has a mid-section which forms a tube-like cylindrical shape onto which lights may be installed. The cylindrical mounting body embodiment has a bottom covering which covers the circular shape of the bottom of the cylindrical mounting body. In other embodiments the mounting body of the submersible lighting device may be other shapes.

In some embodiments the mounting body is configured with an interior void. In some embodiments electrical components related to powering or controlling the lights may be installed in the interior void. In some embodiments the mounting body may be positively buoyant or insufficiently negatively buoyant. A mounting body that is positively buoyant or insufficiently negatively buoyant may have a specific gravity 1.1 or less with respect to freshwater or saltwater. In some embodiments the interior void may be partly or fully filled with a ballast material. In some embodiments the ballast material, or "ballast," may be comprised of granular material such as sand or gravel. Sand and gravel used as ballast material have a dry density of between 1.0 grams/cm$^3$-2.5 grams/cm$^3$. In other embodiments the ballast may be a drying liquid which cures into a solid, such as epoxy. In the epoxy ballast embodiment a denser material may be mixed into the epoxy to increase the specific gravity of the epoxy mixture. In other embodiments the ballast may be metallic or another suitably dense material. The ballast material may serve to counteract the buoyancy quality of the mounting body such that the mounting body is positively buoyant, neutrally buoyant, or negatively buoyant. In some embodiments the interior void may contain electrical components and ballast.

In preferred embodiments a plurality of lights may be disposed around the outer surface of the mounting body. These lights may be oriented such that they emit light away from the outer surface of the mounting body. In some embodiments the lights are comprised of a flexible strip of LED lights. In the cylindrical mounting body embodiment the lights may be wrapped around the mid-section of the mounting body in a helical or spiral pattern. In the cylindrical mounting body embodiments there may be an area on the outer surface of the mounting body above the lights which is configured without lights so as to remain bare. In this embodiment the bare area above the lights is called the upper sealing area. In the cylindrical mounting body embodiments there may be an area on the outer surface of the mounting body below the lights which is configured without lights so as to remain bare. In this embodiment the bare area below the lights is called the lower sealing area.

In some embodiments the submersible lighting device may emit a single-color spectrum. In other embodiments the submersible lighting device may be capable of emitting a variety of color spectrums. In some embodiments, referred to as addressable embodiments, the user may control the color of the emitted light or the intensity of the emitted light. In some addressable embodiments the submersible lighting device may be configured with a digital multiplex (DMX) system, or similar system, to control the color or intensity of the emitted light. In some addressable embodiments the submersible lighting device may be configured with a pulse-width modulation (PWM) system, or similar system, to control the light characteristics or light intensity of the emitted light. In some embodiments the submersible lighting device may be configured with a user controller such that the color spectrum emitted by the light may be controlled by the user. In some embodiments the submersible lighting device may be configured with a user controller such that the light intensity may be controlled by the user.

For the purposes of this invention the light color spectrum is defined as follows: violet (400-420 nano meters, nm), indigo (420-440 nm), blue (440-490 nm), green (490-570 nm), yellow (570-585 nm), orange (585-620 nm), red (620-780 nm).

In preferred embodiments a partly or wholly transparent covering is disposed around the mounting body such that the lights are enveloped by the transparent covering. In embodiments utilizing partially transparent coverings the covering may have a colored tint such that a desired color of light is preferentially filtered through the covering and emitted into the underwater environment. The opacity level of transparent coverings may range between 0.0-0.5. The opacity level of partially transparent coverings may range between 0.05-0.8. In the cylindrical mounting body embodiment the transparent covering may be configured around the mid-section of the mounting body such that the transparent covering comes into contact with the mounting body circumferentially around the upper sealing area and circumferentially around the lower sealing area. In some embodiments the transparent covering makes a water-tight seal against the mounting body where it contacts upper and lower sealing areas. In some embodiments the submersible lighting device is ingress protection 68 (IP68) rated. In other embodiments a sealant material such as silicone or a sealing element such as an o-ring may be applied between the outer surface of the mounting body and the transparent covering.

In some embodiments the transparent covering may be made from a flexible material which may be bound around the mounting body by separate attachment components such as one or more hose clamps. In some embodiments the transparent covering may be made from material which can shrink around the mounting body. In some embodiments the transparent covering may be made out of heat shrink tubing which shrinks when heat is applied to the heat shrink tubing during installation. In some embodiments which utilize heat shrink tubing for the transparent covering, the heat shrink tubing may be made from Polytetrafluoroethylene (PTFE), polyolefin, polyfluoroalkyl substances (PFAS), fluorinated ethylene propylene (FEP), polyvinylidene fluoride (PVDF), polyvinylidene difluoride (PVDF), or other suitable material with similar properties. In other embodiments the transparent covering may be made from plastic, acrylic, or other suitably transparent, durable, and impermeable material. In some embodiments the transparent covering is only partly transparent or transparent only in areas where the emitted light must pass through the transparent covering.

In some embodiments the submersible lighting device is configured with a power cable to supply electrical power to the lights. In some embodiments the power cable is terminated with different plug types such that the power cable may be connected to different power sources. In some embodiments the power cable plug is capable of electrically connecting to direct current (DC) power sources. In some embodiments the power cable plug is capable of electrically connecting to alternating current (AC) power sources. In some embodiments the power cable is terminated with a connector, for example a SAE DC plug, such that the user may connect a variety of power cable adaptors to the connector depending on which power source type the user wishes to use. The power cable may terminate with, or be fitted with an adapter which is terminated with, alligator clips, SAE DC plug, a 12-volt accessory plug, standard 2-prong 120-volt plug, standard 3-prong 120-volt plug, or other power receiving plug.

In some embodiments the power cable is routed through the top covering of the mounting body. In this embodiment the annular space between the top cover and the power cable may be made water-tight to mitigate water ingress. In some embodiments the power cable is configured with a power supply which is electrically connected in series between the power cable plug and the LED lights.

Some of the components of the submersible lighting device and related system described herein may be manufactured and/or assembled in accordance with the conventional knowledge and level of a person having skill in the art.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

First Illustrated Embodiment

The first illustrated embodiment of the submersible lighting device shown in FIG. 1 is configured with a cylindrical mounting body 101. The cylindrical mounting body has a top covering 102, a mid-section, and a bottom covering 103. Towards the top of the mid-section the transparent covering 107 comes into circumferential, water-tight contact with the outer surface of the mounting body around the upper sealing area 104. Towards the bottom of the mid-section the transparent covering comes into circumferential, water-tight contact with the outer surface of the mounting body around the lower sealing area 105. The LED lights 106 are wrapped around the mid-section of the mounting body. The space between the mounting body and transparent covering forms the light enclosure 108. The LED lights are electrically connected to a power cable 109 which exits the interior void 115 through a penetration in the top covering. Because this embodiment is an AC powered embodiment the power cable extends for a variable length before being electrically connected to a power supply 114. The power cable exits the power supply and terminates in a standard three-prong plug 110.

Second Illustrated Embodiment

Figure 2:
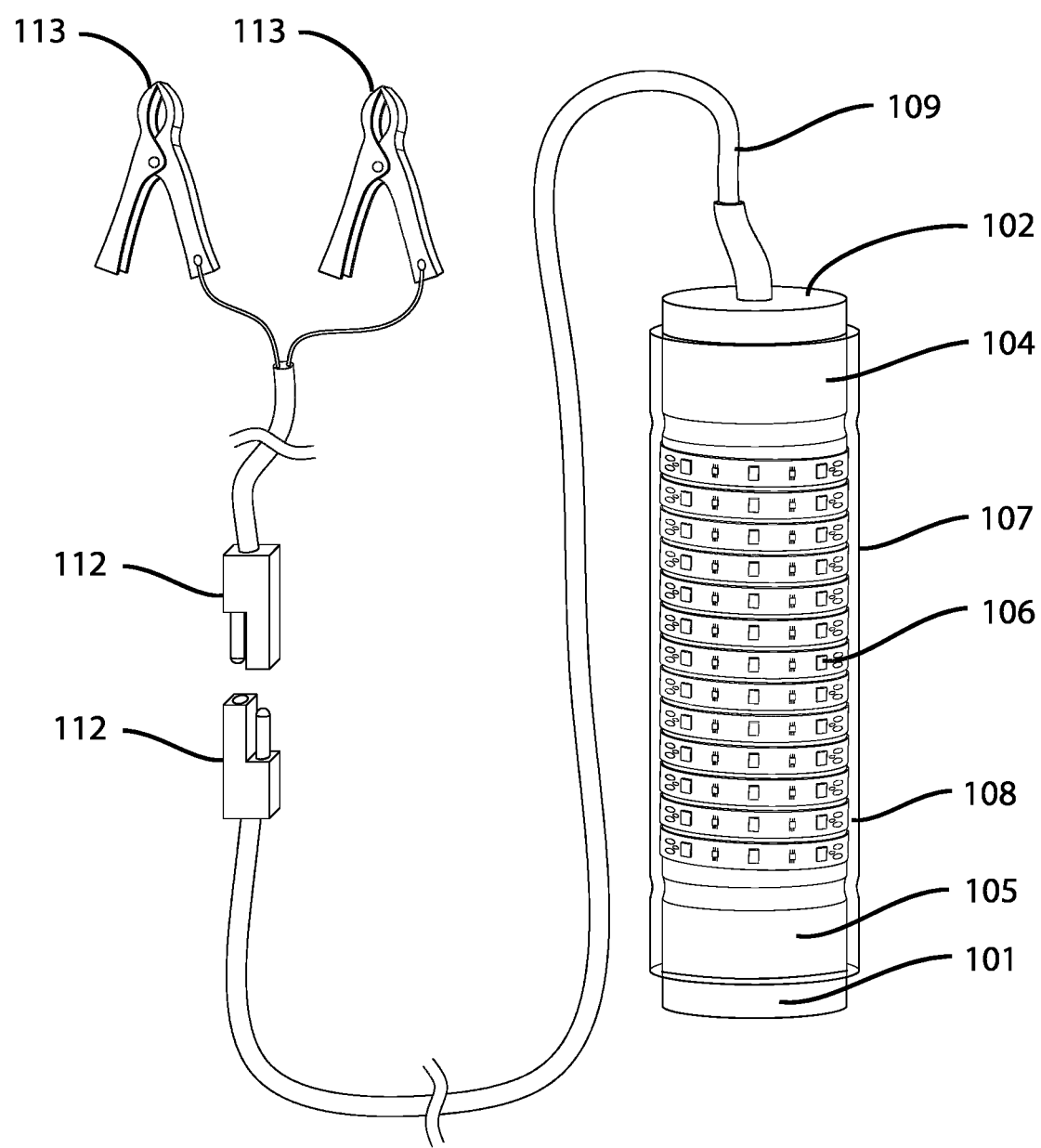
FIG. 2 shows a side view of the submersible lighting device in accordance with a second illustrated embodiment.

The second illustrated embodiment of the submersible lighting device shown in FIG. 2 depicts an embodiment which may be powered by a DC power source, such as a battery. The LED lights 106 are electrically connected to a power cable 109 which exits the interior void 115 through a penetration in the top covering 102. The power cable extends for a variable length before being electrically terminated with a SAE DC plug 112. The SAE DC plug allows the submersible lighting device to be electrically connected to a variety of DC power adapter cables. In the second illustrated embodiment the adapter cable is terminated with a SAE DC plug at its first end and terminated with alligator clips 113 at its second end. The alligator clips may be connected to a the positive and negative terminals of a battery.

Third Illustrated Embodiment

Figure 3:
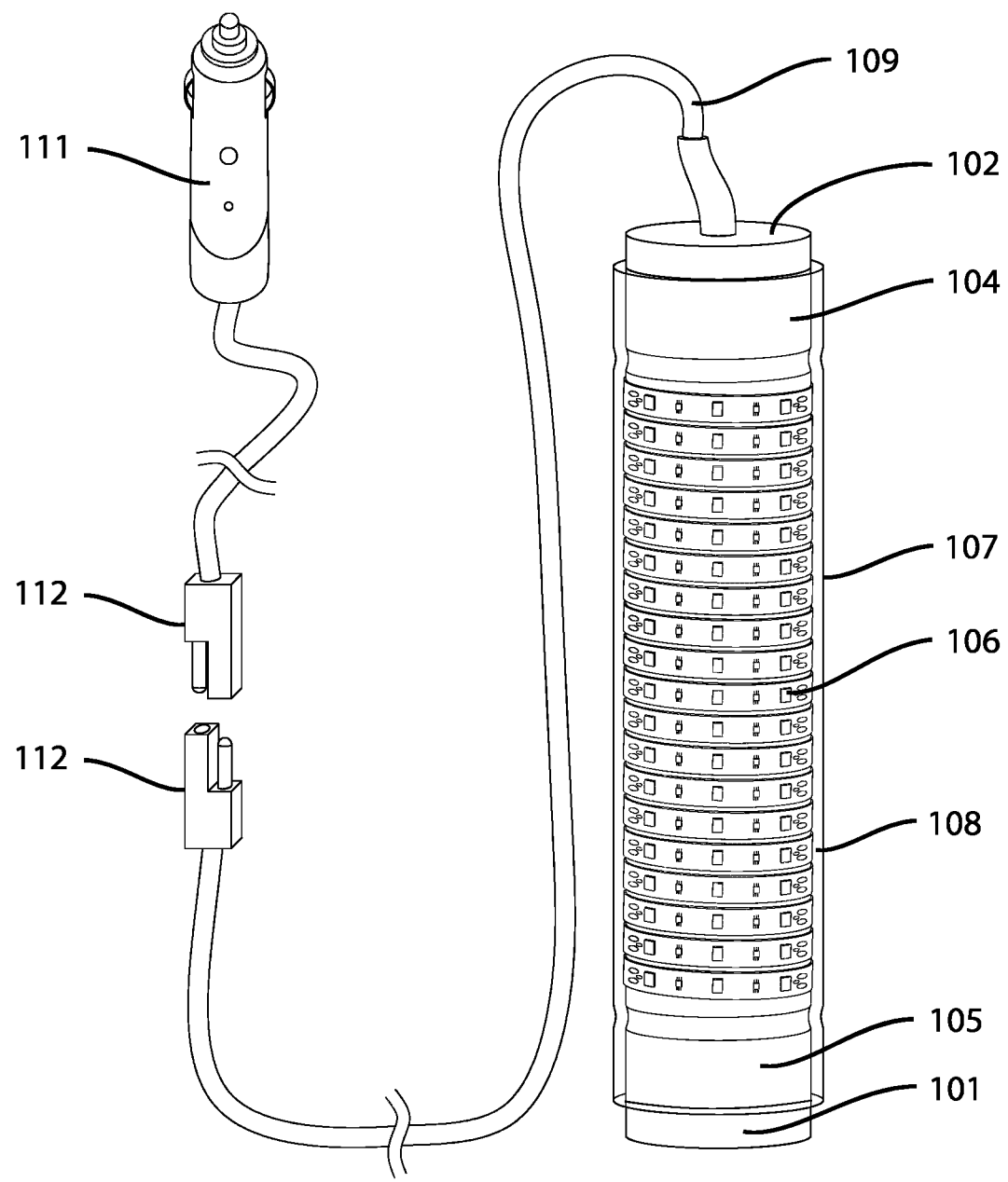
FIG. 3 shows a side view of the submersible lighting device in accordance with a third illustrated embodiment.

The third illustrated embodiment of the submersible lighting device shown in FIG. 3 depicts an embodiment which may be powered by a DC power source, such as a battery. In this embodiment the adapter cable is terminated with a SAE DC plug 112 at its first end and terminated with a 12-volt accessory plug 111 at its second end. The 12-volt accessory plug may be connected to a 12-volt cigarette lighter plug found in some vehicles.

Fourth Illustrated Embodiment

Figure 4:
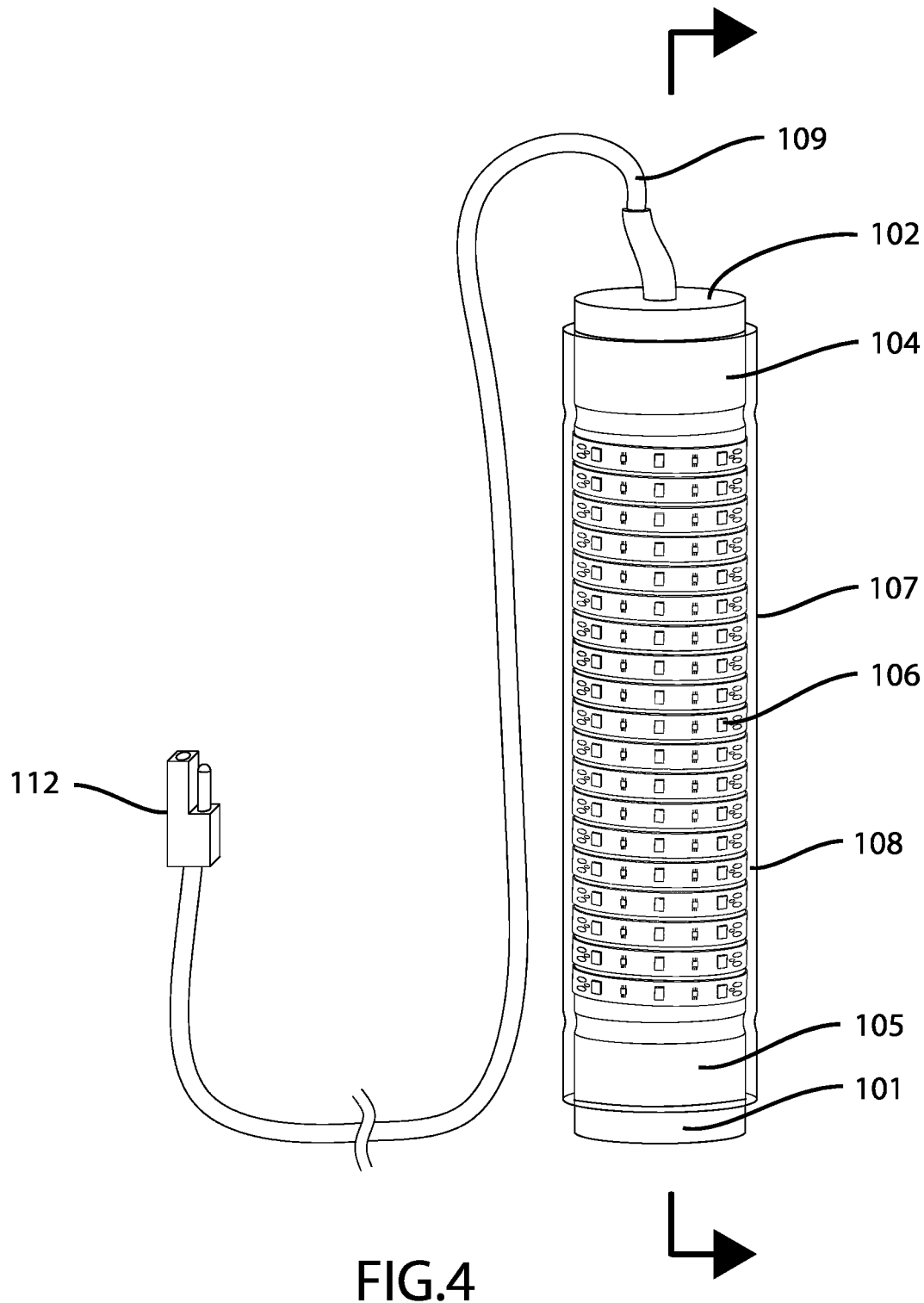
FIG. 4 shows a side view of the submersible lighting device in accordance with a fourth illustrated embodiment.

The fourth illustrated embodiment of the submersible lighting device shown in FIG. 4 depicts an embodiment which may be powered by a DC power source such as a battery. In this embodiment the power cable 109 is terminated with a SAE DC plug 112.

Figure 5:
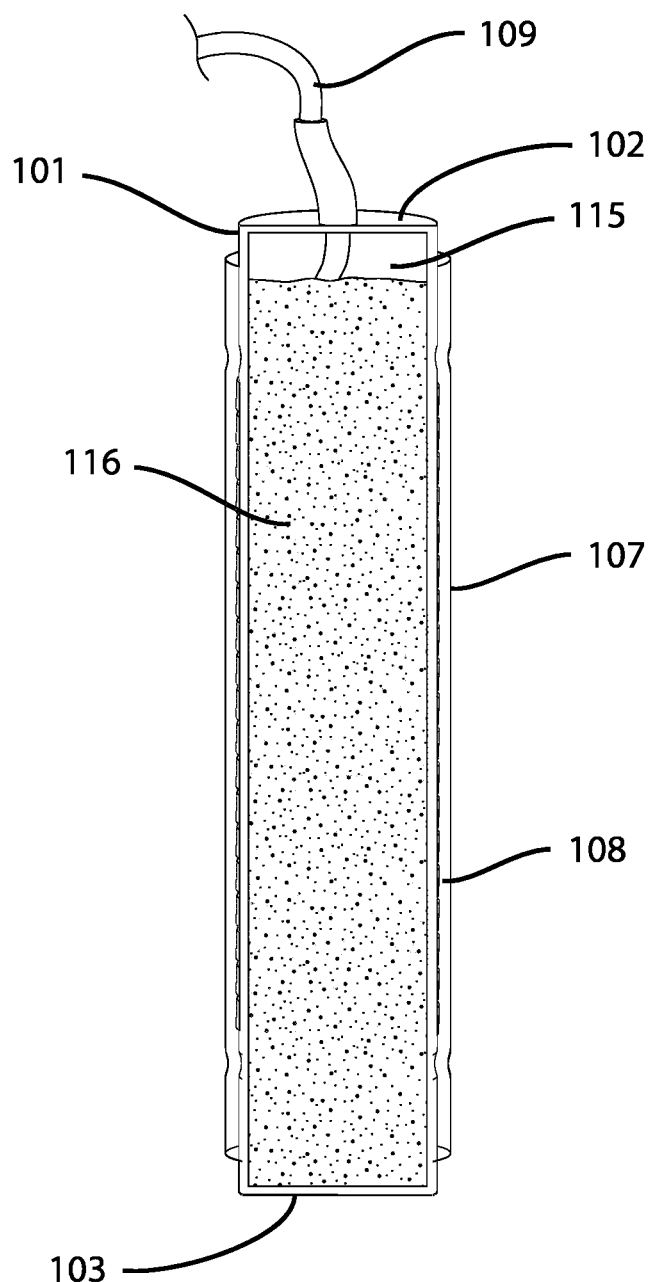
FIG. 5 shows a cut-away side view of the submersible lighting device in accordance with the fourth illustrated embodiment.

FIG. 5 depicts a cut-away perspective of the mounting body such that the interior void 115 may be seen. The interior void is partly filled with ballast material 116 such that the buoyancy of the submersible light is affected. The bottom covering 103 of the cylindrical mounting body is also shown in FIG. 5

FEATURE LIST

Mounting Body (101)
Top Covering (102)
Bottom Covering (103)
Upper Sealing Area (104)
Lower Sealing Area (105)
LED Lights (106)
Transparent Covering (107)
Light Enclosure (108)
Power Cable (109)
Three-prong Plug (110)
12-volt Accessory Plug (111)
SAE DC Plug (112)
Alligator Clips (113)
Power Supply (114)
Interior Void (115)
Ballast Material (116)

What is claimed is:

1. A submersible lighting device comprising:
    a mounting body forming at least one outer surface, the mounting body having an interior void;
    a ballast material disposed within the interior void in order to affect a buoyancy quality of the submersible lighting device, the ballast material comprising small granular material;
    a plurality of lights disposed on the outer surface of the mounting body, oriented such that the plurality of lights emit light away from the outer surface;
    a partly or wholly transparent covering which is disposed around the plurality of lights and the mounting body, creating a water-tight enclosure for the plurality of lights between the transparent covering and the mounting body; and
    a power cable with a first end and a second end, the first end electrically coupled to the plurality of lights to supply electrical power to the plurality of lights, the second end configured to be electrically coupled to a power source.

2. The submersible lighting device comprising of claim 1, wherein:
    the ballast material is sand, gravel, or some combination thereof.

3. The submersible lighting device of claim 1, wherein:
    the mounting body is cylindrical in shape; and the mounting body further comprises a top covering, a bottom covering, and a cylindrical mid-section.

4. The submersible lighting device of claim 3, wherein:
    the plurality of lights are LED strip lights which are wrapped around the cylindrical mounting body in a helical shape.

5. The submersible lighting device of claim 1, wherein:
    each of the plurality of lights emits a green color.

6. The submersible lighting device of claim 1, wherein:
    the second end of the power cable is terminated with battery attachment features configured to electrically couple the battery attachment features to the positive and negative terminals of a battery.

7. The submersible lighting device of claim 1, wherein:
    the second end of the power cable is terminated with an electronic two-prong or three-prong plug configured to be inserted into a suitable AC power outlet.

8. The submersible lighting device of claim 1, wherein:
    the second end of the power cable is terminated with a 12-volt accessory plug configured to be inserted into a suitable auxiliary DC power outlet.

9. The submersible lighting device of claim 1, wherein:
    the second end of the power cable is terminated with a SAE DC plug, which is a Society of Automotive Engineers connector which is a hermaphrodite two-conductor DC connector, such that the power cable is configured to be inserted directly into a suitable auxiliary DC power outlet.

10. A submersible lighting device comprising:
    a mounting body forming at least one outer surface, the mounting body having an interior void;
    a ballast material disposed within the interior void in order to affect a buoyancy quality of the submersible lighting device, the ballast material comprising sand, gravel, or some combination thereof;
    a plurality of lights disposed on the outer surface of the mounting body, oriented such that the plurality of lights emit light away from the outer surface;
    a partly or wholly transparent covering which is disposed around the plurality of lights and the mounting body, creating a water-tight enclosure for the plurality of lights between the transparent covering and the mounting body, the transparent covering being heat shrink tubing disposed around the mounting body such that the heat shrink tubing envelops the plurality of lights and makes circumferential contact with the mounting body above and below the plurality of lights, forming a water-tight enclosure between the mounting body and the heat shrink tubing; and
    a power cable with a first end and a second end, the first end electrically coupled to the plurality of lights to supply electrical power to the plurality of lights, the second end configured to be electrically coupled to a power source.

* * * * *